US009532215B2

(12) United States Patent
Webb

(10) Patent No.: US 9,532,215 B2
(45) Date of Patent: Dec. 27, 2016

(54) SECURE DEPLOYMENT OF TERMINALS IN A WIRELESS NETWORK

(71) Applicant: NEUL LTD, Cambridge (GB)

(72) Inventor: William Webb, Cambridge (GB)

(73) Assignee: Neul Ltd., Cambridge (GB)

( * ) Notice: Subject to any disclaimer, the term of this patent is extended or adjusted under 35 U.S.C. 154(b) by 23 days.

(21) Appl. No.: 14/411,432

(22) PCT Filed: Jun. 25, 2013

(86) PCT No.: PCT/EP2013/063229
§ 371 (c)(1),
(2) Date: Dec. 26, 2014

(87) PCT Pub. No.: WO2014/001305
PCT Pub. Date: Jan. 3, 2014

(65) Prior Publication Data
US 2015/0148009 A1 May 28, 2015

(30) Foreign Application Priority Data
Jun. 29, 2012 (GB) .................................... 1211564.8

(51) Int. Cl.
*H04W 4/00* (2009.01)
*H04W 12/04* (2009.01)
(Continued)

(52) U.S. Cl.
CPC ................ *H04W 12/04* (2013.01); *H04L 9/32* (2013.01); *H04L 9/321* (2013.01); *H04L 9/3202* (2013.01);
(Continued)

(58) Field of Classification Search
CPC ...... H04W 4/005; H04W 12/04; H04W 12/06; H04L 9/32; H04L 9/321; H04L 9/3213; H04L 9/3228; H04L 63/0807; H04L 63/0853; H04L 63/0884
See application file for complete search history.

(56) References Cited

U.S. PATENT DOCUMENTS

2008/0260149 A1* 10/2008 Gehrmann ......... G06Q 20/3821
380/247
2009/0217348 A1* 8/2009 Salmela .................. H04L 63/08
726/2
(Continued)

FOREIGN PATENT DOCUMENTS

WO 2009103623 A2 8/2009

OTHER PUBLICATIONS

"International Mobile Subscriber Idenntity", Wikipedia.org [https://en.wikipedia.org/wiki/Internatonal_Mobile_Subscriber_Identity], Jun. 22, 2012, recovered from Internet Archive Wayback Machine [http://web.archive.org/web/20120622164350/https://en.wikipedia.org/wiki/International_Mobile_Subscribe_Identity].*
(Continued)

*Primary Examiner* — King Poon
*Assistant Examiner* — Vincent Peren
(74) *Attorney, Agent, or Firm* — Slater Matsil, LLP

(57) ABSTRACT

A method for securely deploying a communication device in a communication network, the method comprising: storing a device identity and an associated token in the network; receiving, in the network, a device identity, a token and an indication of a data routing point; determining whether the received device identity and the received token correspond with a device identity and associated token stored by the network; and, if so, determining that the communication device corresponding to the received device identity has been validly deployed in the network and storing the data routing point as a destination to which data associated with the validly deployed communication device should be routed by the network.

22 Claims, 5 Drawing Sheets

(51) Int. Cl.
  *H04W 12/06* (2009.01)
  *H04L 9/32* (2006.01)
  *H04L 29/06* (2006.01)
  *G06F 21/70* (2013.01)

(52) U.S. Cl.
  CPC ........... *H04L 9/3213* (2013.01); *H04L 9/3228* (2013.01); *H04L 63/0807* (2013.01); *H04L 63/0853* (2013.01); *H04L 63/0884* (2013.01); *H04W 12/06* (2013.01); *G06F 21/70* (2013.01); *H04W 4/005* (2013.01)

(56) References Cited

U.S. PATENT DOCUMENTS

| | | | | |
|---|---|---|---|---|
| 2009/0253409 A1* | 10/2009 | Slavov | ............... | H04L 63/0823 455/411 |
| 2011/0086612 A1* | 4/2011 | Montz | ................... | H04L 63/083 455/410 |
| 2011/0265158 A1* | 10/2011 | Cha | ..................... | H04L 63/0823 726/6 |
| 2013/0305330 A1* | 11/2013 | Palanigounder | ...... | H04L 63/062 726/6 |

OTHER PUBLICATIONS

Rongxing Lu et al, "GRS: The green, reliability, and security of emerging machine to machine communications", IEEE Communications Magazine, IEEE Service Center, Piscataway, US, vol. 49, No. 4, Apr. 1, 2011, pp. 28-35.

"Machine-to-Machine communications (M2M): Functional architecture", ETSI Draft, TS 102 690—Proposal for Shall Mayv3, European Telecommunications Standards Institute, 650, Sophia-Antipolis, France, No. vo.11.2, May 17, 2011, pp. 1-198.

"International Search Report and Written Opinion of the International Searching Authority", mailed Nov. 29, 2013, European Patent Office.

* cited by examiner

SECURE DEPLOYMENT OF TERMINALS IN A WIRELESS NETWORK

The invention relates to a method and apparatus for identifying when a communication device has been validly deployed in a communication network.

A communication network may be configured so that it can be used by a wide range of different devices. Such devices will typically be manufactured, distributed and owned by many different parties. An example of such a network is shown in FIG. 5. The network in this example operates according to the so-called "Weightless" communication protocol, which is a protocol for implementing wireless machine-to-machine communications in an unlicensed part of the spectrum. The network, shown generally at 501, may comprise a network core, shown generally at 502, which implements most of the intelligence of the network. The logical network elements that make up the network core are shown separated out in FIG. 5 for clarity but may be physically located within the same platform. The customer portal allows network clients to obtain information from and send information to a set of terminals.

The network shown in FIG. 5 may be run as a wholesale provider of connectivity. The network can be operated by a network provider separate from the clients. The network itself will not hold "ownership" of the subscriber. Preferably the network authenticates messages received by the base stations from terminals operating in the network so that there can be certainty that the message has come from the terminal claimed. Preferably also a strong level of encryption is employed to guard against eavesdropping. Both of these mechanisms are effective when the terminals have already been deployed in the network. What neither mechanism provides, however, is the security of knowing that the terminal has actually been validly deployed in the network in the first place, and that the party purporting to have ownership of the device is actually entitled to do so.

As an example, party B may commission a set of terminals capable of operating in the network shown in FIG. 5. Party B applies to the network provider for a set of terminal identities. However, before those terminals have been deployed and registered with the network, party C (whether by design or accident) contacts the network to register the terminal identities intended for party B in its own name. Party C also registers its own customer portal as the destination for any data transmitted to the network by those terminals. Consequently, when the terminals attach to the network, their data is wrongly routed to the customer portal of party C, rather than party B.

Therefore, there is a need for a mechanism by which communication devices can be securely deployed in a network.

According to a first embodiment of the invention, there is provided a method for securely deploying a communication device in a communication network, the method comprising: storing a device identity and an associated token in the network; receiving, in the network, a device identity, a token and an indication of a data routing point; determining whether the received device identity and the received token correspond with a device identity and associated token stored by the network; and, if so, determining that the communication device corresponding to the received device identity has been validly deployed in the network and storing the data routing point as a destination to which data associated with the validly deployed communication device should be routed by the network.

The network may only communicate with a communication device if it is determined to have been validly deployed in the network.

The method may comprise storing, in the network, authentication data associated with a device identity.

The method may comprise only marking the authentication data as being available for use if the communication device corresponding to the associated device identity is determined to have been validly deployed in the network.

The method may comprise, when the communication device corresponding to the associated device identity is determined to have been validly deployed in the network, deriving an authentication key from the authentication data for use in communicating with that communication device.

The method may comprise the network authenticating a communication with the validly deployed communication device by means of the authentication key.

The method may comprise storing, in a communication device, a device identity corresponding to that communication device.

The method may comprise storing, in a communication device, authentication data associated with the device identity of that communication device.

The method may comprise forwarding a device identity and an associated token to a third party.

The method may comprise the third party, when it has determined that a communication device has been successfully deployed in the network, forwarding the device identity and associated token corresponding to that device to the network.

The method may comprise storing a device identity on a communication device prior to deploying that device in the network.

The method may comprise not storing, on the communication device, the token associated with the stored device identity.

The method may comprise, prior to deploying a communication device in the network, reading the device identity stored on that communication device.

The method may comprise generating a record code for a communication device prior to deploying that communication device in the network and storing the record code in association with the device identity of that communication device.

The method may comprise the third party determining that the communication device has been successfully deployed when the record code is returned to it.

The method may comprise the third party, when a record code is returned to it, forwarding the device identity associated with that record code to the network.

The method may comprise the third party, when a record code is returned to it, forwarding the token associated with the device identity associated with that record code to the network.

The method may comprise the third party, when it has determined that a communication device has been successfully deployed in the network, forwarding an indication of a data routing point for that communication device to the network.

The method may comprise the third party storing the indication of the data routing point.

The method may comprise the third party receiving an indication of the data routing point from the successfully deployed communication device.

The method may comprise an indication of the data routing point being entered into the successfully deployed communication device by a user.

The indication of the data routing point may comprise one or more of a network address, an IP address, a client portal in the network, an email address, a postal address, a telephone number or a twitter account.

According to a second embodiment of the invention, there is provided a network apparatus for determining that a communication device has been securely deploying in a communication network, the apparatus being configured to: store a device identity and an associated token; receive a device identity, a token and an indication of a data routing point; determine whether the received device identity and the received token correspond with a device identity and associated token stored by the apparatus; and, if so, determine that the communication device corresponding to the received device identity has been validly deployed in the network and store the data routing point as a destination to which data associated with the validly deployed communication device should be routed by the network.

For a better understanding of the present invention, reference is made by way of example to the following figures, in which.

Figure 1:
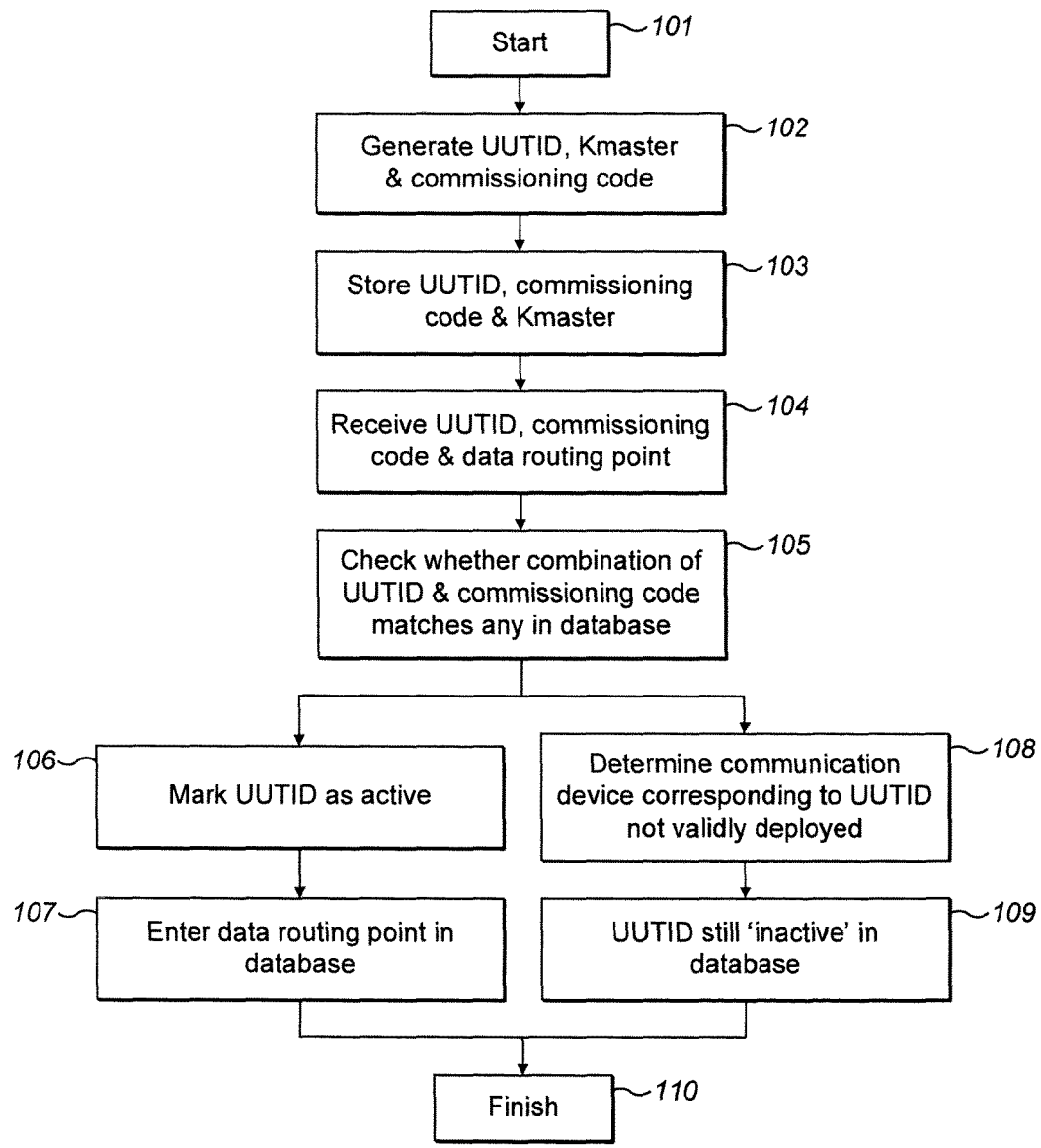
FIG. 1 shows an example of a method for determining that a communication device has been successfully deployed in a network.

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

A communication device may be securely deployed in a communication network by means of a token assigned to that device (probably before it is even manufactured) by the network. The token may be stored by the network together with an associated device identity. The tokens and identities could remain in a database for years without ever being activated. However, if the network receives a device identity and a token from a third party, most likely a manufacturer of communication devices, and confirms that the combination is stored in the database, the network may determine that the device has been validly deployed in the network. The network may also receive an indication of a data routing point with the device identity and token. If the network determines that the communication device was validly deployed, it preferably stores the data routing point as a destination or address to which data associated with the validly deployed communication device should be routed by the network.

Each token is preferably unique and associated with only one device identity. One way of achieving this is for the network to generate a random number each time that it generates a new device identity, with the random number serving as the token associated with that identity. The token provides an extra layer of security. It is preferably forwarded to a third party together with the device identity. The third party might be a chip manufacturer, a manufacturer of communication devices and/or an owner of communication devices. It is the third party's responsibility to keep the token secure and confidential (one method by which this might be achieved is explained below). When the communication device is validly deployed, the third party returns the token to the network as proof of that valid deployment. The token provides an extra layer of security without requiring burdensome processes or the distribution of additional security keys.

The token confirms to the network that a device has been deployed in the network. The device identity lets the network know which device was deployed. The combination of the token and the identity, providing that they match a combination in the network's database, confirms that source of the information about the deployment can be trusted, since only the third party to whom the device identity and token was originally issued should be in possession of both of them. Therefore, the network can be confident that the device has been validly deployed. If combination of token and identity is correct, this also confirms to the network that the accompanying indication of a data routing point can be trusted. Therefore, the network can be confident that this is the correct destination for data associated with the communication device.

An example of a method for checking that a communication device has been securely deployed in a network is shown in FIG. 1. The process starts in step 101. In step 102 a security manager generates a device identity (the uuTID in this example, which may be a numeric sequence similar to a telephone number) a token (the commissioning code in this example), and a secret key to be used by the device when it is communicating in the network ($K_{master}$ in this example). This generation may be triggered by a request from a manufacturer. In step 103 the device identity, its associated token and the secret key are stored in a database in the network. At the same time, the device identity and its associated token may be forwarded to the manufacturer. The network may take no further action with respect to the device identity and its associated token until it receives a uuTID, a commissioning code and a data routing point from the network (step 104). The network checks whether the combination of uuTID and commissioning code matches one of the device identity/token combinations in the database (step 105). If yes, the device is determined to have been validly deployed in the network and the device identity is marked as 'active' in the database (step 106). The network then enters the data routing point that accompanied the uuTID and the commissioning code into the database so that future communications associated with the communication device can be directed to that data routing point (step 107). If the received uuTID and commissioning code combination does not match one of the device identity/token combinations in the database, the network may determine that the communication device was not validly deployed (step 108). The device identity therefore remains 'inactive' in the database (step 109). The process terminates in step 110.

Figure 2:
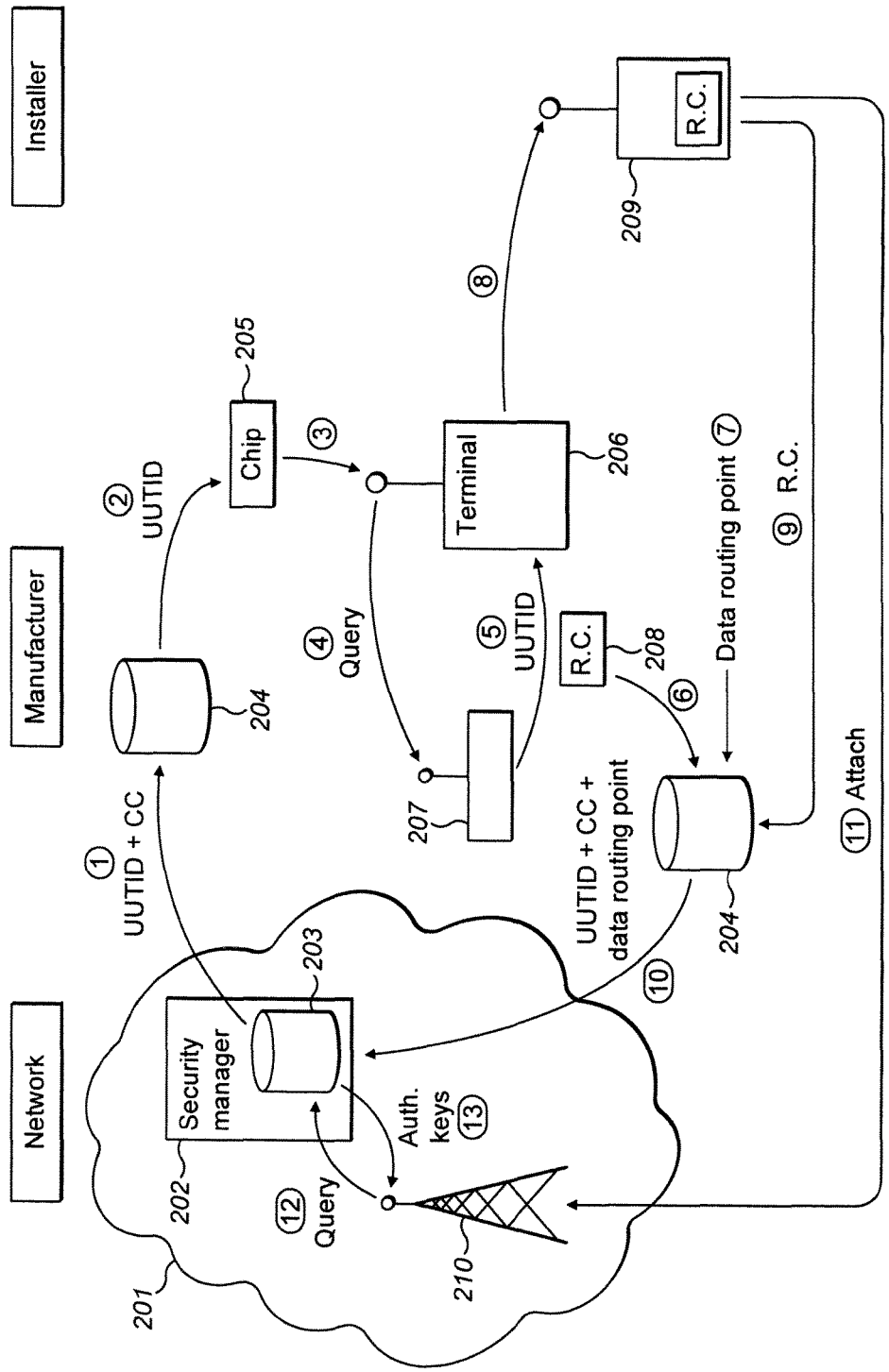
FIG. 2 shows an example of a communication device being successfully deployed in a network.

An example of a communication device being validly installed in a network is shown in FIG. 2. The network, shown generally at 201, comprises a security manager 202 and a database 203. The security manager issues a device identity and a token on request from a manufacturer. In other embodiments, the device identity and token could be issued by a security body located outside of the network. The device identity and associated token are stored in database 203 before being forwarded to the manufacturer (1). The manufacturer stores the device identity and associated token in its own database 204. The device identity may also be stored on a chip 205 that will be inserted into a communication device to enable it to operate in network 201 (2).

The communication chip may then be placed in a communication device, which in this case is terminal 206 (3). The manufacturer may then power-up the terminal and initiate a data exchange with a local 'test' base station 207 (4). As part of this data exchange, the base station may extract the device identity from chip 205. This acts as a useful check that terminal 205 actually contains the chip having the expected device identity, particularly if, as may often be the case, chip 205 was actually 'bought in' by the terminal manufacturer from a separate chip manufacturer. It may be convenient at this stage for the manufacturer to associate the device identity with a further code or other means of identification—in this example record code 208. This enables the manufacturer to hand the terminal over to a third party installer without having to release the device identity. The record code might be recorded as a barcode, QR code or similar on a stick-on label that can be attached to the communication device or its packaging (5). The terminal 209 with its associated record code may then be passed to a third party installer for deployment in the network (8).

The manufacturer may save the record code 208 together with the device identity and associated token in its database 204 (6). The manufacturer may also save one or more data routing points to which data associated with terminal 209 should be routed in the future.

The data routing point might be associated with the manufacturer or a third party purchaser/leaser of terminal 209 (such as a third party organisation or individual end user). The indication of the data routing point transmitted to the network might be, for example, one or more of an address in network 201, an IP address, a telephone number, an email address, a postal address, a twitter account etc. An address in network 210 might specify a particular base station controller or base station (e.g. base station 210) to which data travelling to or from the terminal should be routed. It might also be the address of a client portal or gateway through which a client can control terminals deployed in network 201.

The data associated with terminal 209 might be data intended for the terminal, either by network 201 and its control apparatus, or by a client with which terminal 209 is associated. The data associated with terminal 209 might also be data transmitted by the terminal to the network.

When terminal 209 is installed, the installer suitably returns the record code to the manufacturer to confirm installation has been completed (9). This might be achieved, for example, by the installer scanning the QR code or barcode with a handheld scanner that returns that data over a wireless link to the manufacturer. Other commissioning data might also be returned to the manufacturer, e.g. a barcode containing a home reference number. The manufacturer uses the record code (and possibly any other returned data) to look up the device identity and token corresponding to terminal 209 and forward them to network 201 (10). Security manager 202 is then able to determine that a device having the identity uuTID has been validly deployed in the network. The status of that device identity can be changed to "active" in database 203 accordingly. The data routing point for validly-deployed terminal 209 can also be entered into database 203.

When terminal 209 is first activated it attempts to attach to network 201 via base station 210 (11). Base station 210 (or its associated base station controller) may apply to the security manager 202 for authentication information to use in communicating with terminal 209 (12). This authentication information may include one or more keys derived from a master key $K_{master}$ that is stored in both database 203 and chip 205 contained within terminal 209. Together the device identity, token and master key form a 'code triplet' that is required by a manufacturer wanting to make communication devices that can be deployed in communication network 201. The derived keys may include, for example, one or more of $K_{auth}$ for authenticating a communication device with the network, $K_{data}$ for encrypting wireless communications between a communication device and the network and $K_{control}$ for encrypting control messages from the base station. The security manager is preferably configured only to forward the requested security information to the base station if the communication device in question is marked as being 'active'—i.e. validly deployed—in database 203 (13). If the communication device is marked as being 'inactive', its request to attach to a base station is preferably refused.

Some practical examples of applications that may be associated with network 201, and the clients, communication devices and data routing points associated with those applications are:

A utility company deploying thousands of utility meters to monitor water, electricity and/or gas usage. Meter readings from those terminals might be routed to the client portal associated with the utility company, allowing the utility company to monitor usage, check for power outages, issue bills etc.

A automotive manufacturer installing remote diagnostics tools on its vehicles, which might report back to the manufacturer on mileage, performance, temperature etc., enabling the manufacturer to determine when a vehicle should be serviced or a component replaced so that it can contact the vehicle's owner to inform them. Readings from the diagnostics tools might be read back to a client portal associated with the automotive manufacturer.

A GPs surgery might issue diabetic patients with blood glucose monitors that report back to a client portal associated with the surgery, enabling a doctor to be alerted if one of his patient's blood glucose readings go outside of the safe range.

In most cases the communication devices deployed in the network will not be manufactured, deployed or owned by the network provider. It is important that the network provider puts in place a mechanism by which it can be confident that communication devices have been validly deployed. Otherwise, whether by mistake or design, it is possible that third parties could claim to own a device in the network that is not actually theirs. The result could be data associated with the device being routed to the wrong destination. By only recording a device as being 'active' when a device identity is returned to the network accompanied by the correct token, the network can be confident that, at least as far as the manufacturer is concerned, the communication device has been correctly deployed. Responsibility for keeping the issued tokens secure and ensuring that the correct data routing point is forwarded to the network lies with the manufacturer, which minimises the additional burden placed on the network.

Figure 3:
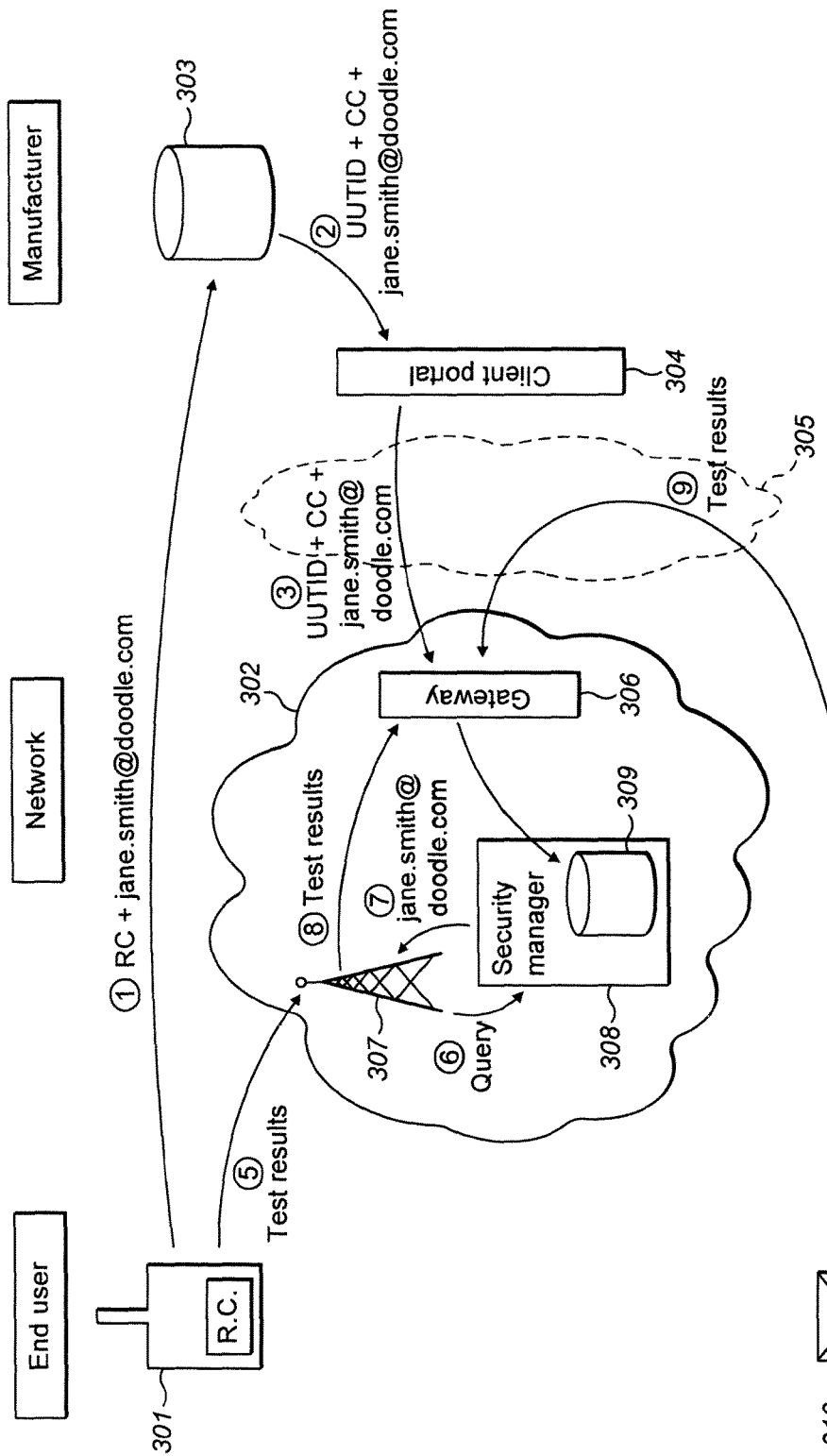
FIG. 3 shows an example of a data routing point being registered with a network.

In some scenarios the data routing point may not actually be known when the communication device leaves the manufacturer. An example might be a communication device that is designed to report to a data routing point of the end user's choice, e.g. an email address or a mobile phone number. An example of one scenario is shown in FIG. 3, in which the communication device is a pregnancy tester 301 that contains a chip enabling it to communicate as part of network 302. The pregnancy tester may be configured to report the results of the test to a destination of the end user's choice. However, this destination is not known at the time when the pregnancy tester leaves the manufacturer's premises.

In the example of FIG. 3, it is the end user who returns the record code to the manufacturer. This could be done, for example, by the end user taking a photograph of a QR code with their smart phone and emailing it to the manufacturer with an indication of the destination that the end user wants the results to be routed to. In this example, the end user chooses her email address and forwards this to the manufacturer together with the record code (1). The manufacturer retrieves the device identity and token corresponding to the record code from its database 303 and forwards them, together with the user's email address, to network 302 (2).

In FIG. 3 the manufacturer's access to the network is shown to be by way of client portal 304. The portal may enable the manufacturer to obtain information from and send information to its set of terminals in network 302. The portal may be provided as a remote service and accessed via standard protocols such as SQL or SOAP.

The device identity, token and user's email address are forwarded to network 302 via the internet 305, where they are received by network gateway 306 (3). The network gateway forwards the device identity, token and user's email address to security manager 308 so that pregnancy tester 301 is treated as an 'active' terminal in the network and the user's email address is stored as the appropriate data routing point (4).

The end user then uses the pregnancy tester 301, which attaches to base station 307 to transmit the test results to the network (5). The network queries database 309 to discover the appropriate data routing point (6). The user's email address is returned in response to that query (7) and the test results are forwarded to gateway 306 (8) for transmission via the internet as email 310 (9).

The record code by which the manufacturer recognises the device that has been deployed is suitably returned to the manufacturer before the device attempts to connect to the network. Otherwise the device would be attempting to connect to a network that did not recognise it as a validly deployed device. Consequently the record code is preferably returned to the manufacturer either by means of a different communication device from the one being deployed (via either the network in which the communication device in question is being deployed or via a different network) or by means of the communication device that is being deployed but via a different network (e.g. via a wired connection or via a wireless network such as a WiFi or cellular network).

Figure 4:
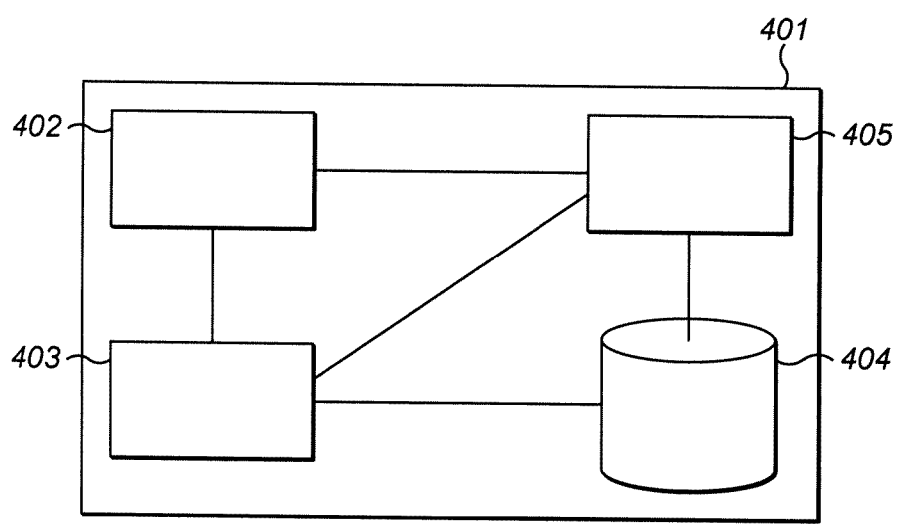
FIG. 4 shows an example of a network apparatus.

An example of a network apparatus that may be used to implement one or more of the methods described herein is shown in FIG. 4. The apparatus, shown generally at 401, comprises a communication unit 402 for communicating with other apparatus in the network, via either wired or wireless means. The apparatus also comprises a database 404 for storing device identities, tokens and associated routing information, together with an indication of whether or not a device has been validly deployed in the network. Verification unit 403 may be configured to receive device identities and tokens forwarded to the apparatus from third parties, check that they correspond to a record in the database and update the status of that device identity in the database accordingly. The apparatus may further comprise an authentication unit 405 for retrieving authentication information for validly deployed terminals from the database and, where required, deriving new authentication keys from the stored information to distribute in the network.

The apparatus shown in FIG. 4 is shown illustratively as comprising a number of interconnected functional blocks. This is for illustrative purposes and is not intended to define a strict division between different parts of hardware on a chip. In practice, the apparatus preferably uses a microprocessor acting under software control for implementing the methods described herein. In some embodiments, the algorithms may be performed wholly or partly in hardware. In one particularly preferred embodiment, the apparatus may be implemented as a database running software so that it can be implemented by a wide range of platforms. One possibility is for the architecture to be hosted on a "software as a service" remote system.

The examples above describe scenarios in which a single data routing point is associated with a particular device. However, more than one data routing point may be stored. Different data routing points may be associated with different types of data, with the network capable of distinguishing between them and routing data to the appropriate one of multiple possible destinations.

The term "manufacturer" has been used above to refer to a third party company that distributes communication devices throughout the network. It should be understood that this is for the purposes of example only, and the term "manufacturer" as it is used herein may be applied to any third party distributing communication devices in the network, irrespective of whether or not it manufactures those devices.

Figure 5:
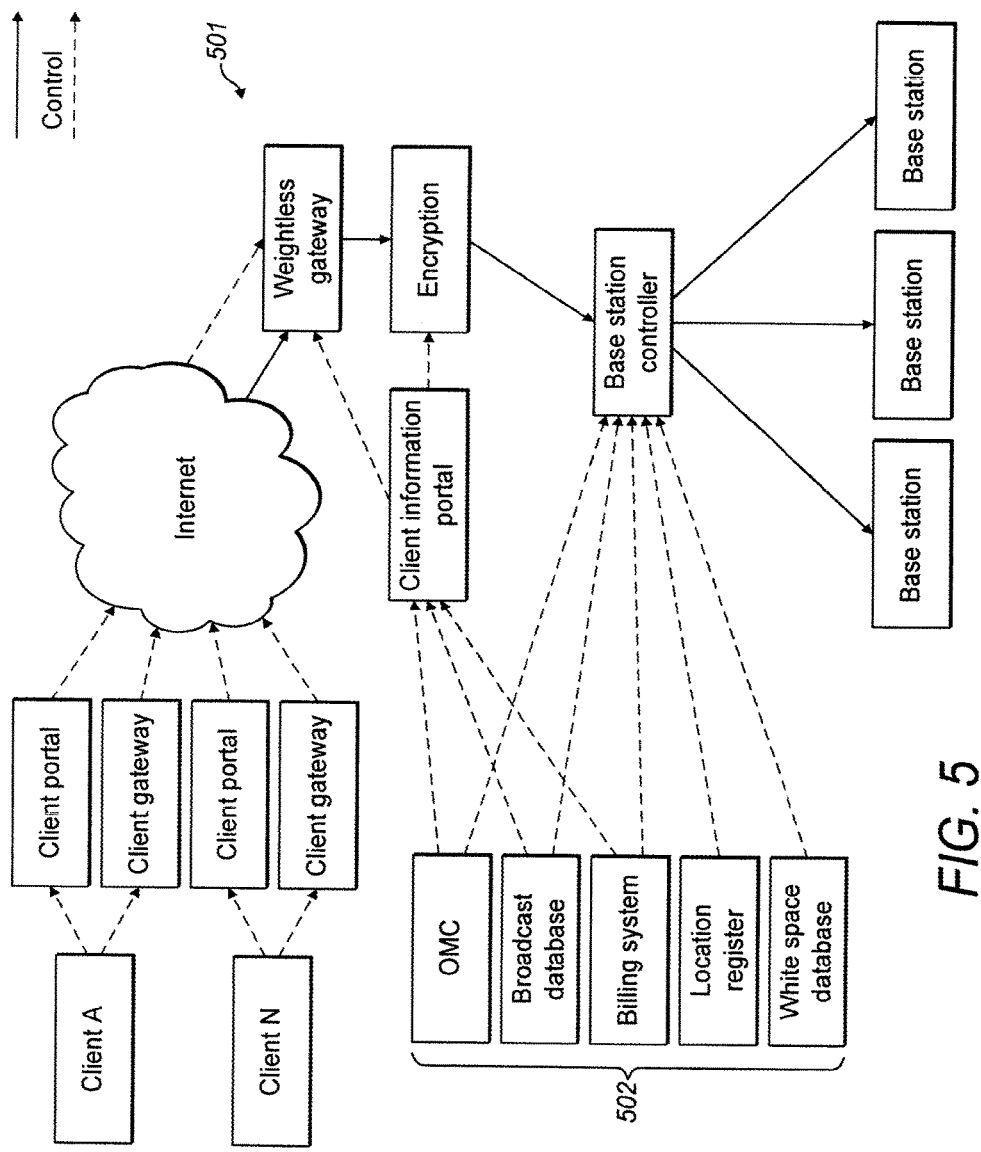
FIG. 5 shows an example of a communication network.

The network in which the communication device is deployed may be a wired network, a wireless network or a network employing both wired and wireless means. The network may be configured as shown in FIG. 5. In one exemplary embodiment, the network may be a network configured to operate in so-called whitespace: a part of the spectrum that is made available for unlicensed or opportunistic access. Typically whitespace is found in the UHF TV band and spans 450 MHz to 800 MHz, depending on the country.

A network such as that shown in FIG. 5 may be used for machine communications, i.e. communications that do not involve human interaction. Machine-to-machine communications are well-matched to the limitations of operating in whitespace, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are able to tolerate the delays and breaks in communication that can result from these varying communication conditions. Services can be provided in non real-time; low latency is not important as long as data is reliably delivered.

A network that is configured to machine communications may be used by a wide-range of different devices, having different owners, uses and communication capabilities. The methods and apparatus described herein may ensure that those devices can be commissioned, manufactured and deployed securely.

The network may implement a communication protocol such as the Weightless protocol for machine communications. The embodiments described herein might be implemented using Weightless terminals, base stations and/or any other network equipment. Weightless is mentioned for the purposes of example only. It should be understood that the methods described herein might be implemented in a network configured to operate in accordance with any communication protocol.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A method for securely deploying a communication device in a communication network, the method comprising:
   storing a first device identity and a first token in the network;
   receiving, in the network, a second device identity, a second token and an indication of a data routing point, wherein the second device identity, the second token and the indication of the data routing point are forwarded to the network by a third party outside of the network in response to the third party determining that the communication device has been validly deployed in the network;
   determining, in the network, whether the second device identity and the second token correspond with the first device identity and the first token stored by the network; and, if so: determining that the communication device corresponding to the second device identity has been validly deployed in the network; and
   storing, in the network, the data routing point as a destination to which data associated with the validly deployed communication device should be routed by the network.

2. A method as claimed in claim 1, further comprising the network only communicating with the communication device if it is determined to have been validly deployed in the network.

3. A method as claimed in claim 1, further comprising storing, in the communication device, the second device identity corresponding to that communication device.

4. A method as claimed in claim 1, further comprising storing, in the communication device, authentication data associated with the second device identity.

5. A method as claimed in claim 1, wherein the indication of the data routing point comprises one or more of a network address, an IP address, a client portal in the network, an email address, a postal address, a telephone number or a twitter account.

6. A method as claimed in claim 1, further comprising storing, in the network, authentication data associated with the first device identity.

7. A method as claimed in claim 6, further comprising only marking the authentication data as being available for use if the communication device is determined to have been validly deployed in the network.

8. A method as claimed in claim 6, further comprising, when the communication device is determined in the network to have been validly deployed in the network, deriving an authentication key from the authentication data for use in communicating with that communication device.

9. A method as claimed in claim 8, further comprising the network authenticating a communication with the validly deployed communication device by means of the authentication key.

10. A method as claimed in claim 1, further comprising forwarding the second device identity and the second token to the third party from the network.

11. A method as claimed in claim 10, further comprising storing the second device identity on the communication device prior to deploying that device in the network.

12. A method as claimed in claim 11, further comprising not storing, on the communication device, the second token.

13. A method as claimed in claim 11, further comprising, prior to deploying the communication device in the network, reading, by the third party, the second device identity stored on that communication device.

14. A method as claimed in claim 1, further comprising:
    generating a record code for the communication device prior to deploying the communication device in the network; and
    storing, by the communication device, the record code in association with the second device identity.

15. A method as claimed in claim 14, further comprising the third party determining that the communication device has been successfully deployed when the record code is returned to the third party from the communication device.

16. A method as claimed in claim 15, further comprising the third party, when the record code is returned to the third party from the communication device, forwarding the second device identity associated with that record code to the network.

17. A method as claimed in claim 15, further comprising the third party, when the record code is returned to the third party, forwarding the token associated with the second device identity associated with that record code to the network.

18. A method, comprising:
    storing a first device identity and a first token in a network;
    receiving, in the network, a second device identity, a second token and an indication of a data routing point;
    determining whether the second device identity and the second token correspond with the first device identity and the first token stored by the network;
    determining that a communication device corresponding to the second device identity has been validly deployed in the network in response to determining that the second device identity and the second token correspond with the first device identity and the first token stored by the network;
    storing the data routing point as a destination to which data associated with the validly deployed communication device should be routed by the network;
    forwarding the second device identity and the second token to a third party;
    determining, by the third party, that the communication device has been successfully deployed in the network;
    forwarding, by the third party, the second device identity and the second token corresponding to that device to the network; and
    the third party, when it has determined that the communication device has been successfully deployed in the network, forwarding the indication of a data routing point for that communication device to the network.

19. A method as claimed in claim 18, further comprising the third party storing the indication of the data routing point.

20. A method as claimed in claim 18, further comprising the third party receiving the indication of the data routing point from the successfully deployed communication device.

21. A method as claimed in claim 18, further comprising the indication of the data routing point being entered into the successfully deployed communication device by a user.

22. A network apparatus for determining that a communication device has been securely deploying in a communication network, comprising:

a processor; and a computer-readable storage medium storing a program to be executed by the processor, the program including instructions for:

storing a first device identity and a first token;

receiving a second device identity, a second token and an indication of a data routing point, wherein the second device identity, the second token and the indication of the data routing point are forwarded to the apparatus by a third party outside of the network in response to the third party determining that the communication device has been validly deployed in the network;

determining whether the second device identity and the second token correspond with the first device identity and the first token stored by the apparatus; and, if so:

determining that the communication device has been validly deployed in the network; and storing the data routing point as a destination to which data associated with the validly deployed communication device should be routed by the network.

* * * * *